(12) United States Patent
Jacobs

(10) Patent No.: US 7,336,825 B2
(45) Date of Patent: Feb. 26, 2008

(54) SEGMENTING A COMPOSITE IMAGE VIA MINIMUM AREAS

(75) Inventor: Johannes W. M. Jacobs, Kessel (NL)

(73) Assignee: Océ-Technologies B.V., Venlo (NL)

( * ) Notice: Subject to any disclaimer, the term of this patent is extended or adjusted under 35 U.S.C. 154(b) by 872 days.

(21) Appl. No.: 10/718,540

(22) Filed: Nov. 24, 2003

(65) Prior Publication Data
US 2004/0105583 A1 Jun. 3, 2004

(30) Foreign Application Priority Data
Nov. 22, 2002 (EP) ................. 02079882

(51) Int. Cl.
*G06K 9/34* (2006.01)
(52) U.S. Cl. ..................... 382/172
(58) Field of Classification Search ............... 382/173, 382/174, 203, 284, 286; 345/442
See application file for complete search history.

(56) References Cited

U.S. PATENT DOCUMENTS
4,849,910 A * 7/1989 Jacobs et al. ............... 345/442

6,633,669 B1 * 10/2003 Atkinson ..................... 382/174

OTHER PUBLICATIONS

Belaid et al., IEEE, XP010231002, pp. 744-747 (1995).
Hare et al., IEEE, XP010115147, pp. 239-242 (1993).
Part et al., Scripta Technica Journals, vol. 24, No. 9, pp. 84-96 (1993).
Antonacopoulos et al., IEEE, pp. 339-344 (1994).

* cited by examiner

*Primary Examiner*—Duy M. Dang
(74) *Attorney, Agent, or Firm*—Birch, Stewart, Kolasch & Birch, LLP

(57) ABSTRACT

A method and device are provided for segmenting an image of pixels into a number of fields. First the method finds field separators using the background of the image, in particular white areas between, for instance, text fields. The segmenting includes constructing: a tessellation grid of lines and nodes formed by extending the field separators along at least one separation direction (in practice, horizontal and vertical) to an outer border of the image, and a set of basic rectangles enclosed by the lines of the tesselation grid of field separators and extended field separators. Finally the fields are constructed by consolidating basic rectangles that are adjacent without being separated by a field separator.

19 Claims, 9 Drawing Sheets

SEGMENTING A COMPOSITE IMAGE VIA MINIMUM AREAS

The present application claims, under 35 U.S.C. § 119, the priority benefit of European Patent Application No. 02079882.3 filed Nov. 22, 2002, the entire contents of which are herein fully incorporated by reference.

BACKGROUND OF THE INVENTION

1. Field of the Invention

The invention relates to a method of segmenting a composite image of pixels into a number of fields corresponding to layout elements of the image, the pixels having a value representing the intensity and/or color of a picture element, which method comprises finding field separators corresponding to areas of adjacent pixels of the image, having a predefined property indicative of a background of the image. The invention further relates to a device for segmenting a composite image of pixels into a number of fields corresponding to layout elements of the image, the pixels having a value representing the intensity and/or color of a picture element, which device comprises an input unit for inputting an image, and a processing unit for finding field separators corresponding to areas of adjacent pixels having a predefined property indicative of a background of the image.

2. Discussion of the Related Art

A method for page segmentation is known from the article "Flexible page segmentation using the background" by A. Antonacopoulos and R. T Ritchings in Proceedings $12^{th}$ International Conference on Pattern Recognition, Jerusalem, Israel, October 9-12, IEEE-CS Press, 1994, vol2, pp. 339-344. According to this method, the image is represented by pixels that have a value representing the intensity and/or color of a picture element. This value is classified as background (usually white) or foreground (usually black, being printed space). The white background space that surrounds the printed regions on a page is analyzed. The background white space is covered with tiles, i.e. non-overlapping areas of background pixels.

The contour of a foreground field in the image is identified by tracing along the white tiles that encircle it, such that the inner borders of the tiles constitute the border of a field for further analysis. A problem of this method, however, is that the borders of the fields are represented by a complex description which frustrates efficient further analysis.

SUMMARY OF THE INVENTION

It is an object of the invention to provide a method and device for segmenting an image which are more reliable and less complicated.

According to a first aspect of the present invention, there is provided a method of segmenting a composite image of pixels into a number of fields corresponding to layout elements of the image, the pixels having a value representing an intensity and/or color of a picture element, the method comprising: finding field separators corresponding to areas of adjacent pixels of the image, having a predefined property indicative of a background of the image; extending the field separators along at least one separation direction to an outer border of the image; constructing a tesselation grid of lines corresponding to the extended field separators; constructing a set of basic rectangles, a basic rectangle being an area enclosed by lines of the tesselation grid; and constructing the fields by connecting basic rectangles that are adjacent and not separated by a field separator.

According to a second aspect of the invention, there is provided a computer program product embodied on at least one computer-readable medium, for segmenting a composite image of pixels into a number of fields corresponding to layout elements of the image, the pixels having a value representing an intensity and/or color of a picture element, the computer program product comprising computer-executable instructions for: finding field separators corresponding to areas of adjacent pixels of the image, having a predefined property indicative of a background of the image; extending the field separators along at least one separation direction to an outer border of the image; constructing a tesselation grid of lines corresponding to the extended field separators; constructing a set of basic rectangles, a basic rectangle being an area enclosed by lines of the tesselation grid; and constructing the fields by connecting basic rectangles that are adjacent and not separated by a field separator.

According to a third aspect of the invention, there is provided a device for segmenting a composite image of pixels into a number of fields corresponding to layout elements of the image, the pixels having a value representing the intensity and/or color of a picture element, the device comprising: an input unit for inputting an image; and a processing unit for finding field separators corresponding to areas of adjacent pixels having a predefined property indicative of a background of the image, wherein the processing unit extends the field separators along at least one separation direction to an outer border of the image, constructs a tesselation grid of lines corresponding to the extended field separators, constructs a set of basic rectangles, a basic rectangle being an area enclosed by lines of the tesselation grid, and constructs the fields by connecting basic rectangles that are adjacent and not separated by a field separator.

Normally, an image contains field separators having one of at least two separation directions, usually horizontal and vertical, that connect and/or cross and together enclose the lay-out elements such as text fields. The effect of the present method is that a tessellation grid is formed by lines based on extending the field separators to the outer borders. Every area enclosed but not sub-divided by the grid is called a basic rectangle, and further analysis is performed on these basic rectangles. The advantage of the set of basic rectangles is that fields can be easily constructed by connecting the basic rectangles. It is to be noted that calculation on the level of basic rectangles is computationally substantially more efficient than connecting individual pixels or small pixel based objects.

The invention is based on the following recognition. Segmentation is the process of identifying objects in the image at a relevant hierarchical level. For example, in a newspaper page a hierarchy could be a lowest level of pixels, then a level of objects of connected pixels (e.g. characters or separators), then text lines, then text fields, then columns and finally articles. The inventors have seen that for finding fields in a structured image, a building block that is just below the required level of fields can be constructed by a transformation from the lower level of field separators to a building block level. The basic rectangles are the building blocks that can be efficiently constructed via the tessellation grid. The step of connecting basic rectangles to an area takes place on the building block level. Finally a transformation from the building block level to the field level is achieved by consolidating basic rectangles into fields on the basis of the original connection points of field separators or nodes of the image. Hence, the construction of basic rectangles provides a convenient way of determining building blocks of fields during segmenting a digital image which predominantly has polygon fields.

In an embodiment of the method, the step of constructing the set of basic rectangles comprises constructing a matrix map representing the tessellation grid by a two-dimensional array of elements that each represent either a basic rectangle or a line segment of the tessellation grid, an element having a first predefined value for representing a line corresponding to a field separator or a further different value for representing a basic rectangle or a line corresponding to an extended field separator. The advantage is that the matrix map comprises the basic rectangles and the boundaries between the basic rectangles. The matrix map can be processed easily because it represents the image on a level of building blocks of fields without geometric details that would otherwise complicate calculations.

In an embodiment of the method, nodes are defined at points in the original image at positions where the field separators connect and at corresponding positions in the tesselation grid, and the step of constructing the fields comprises constructing a node matrix corresponding to the tessellation grid and including elements referring to nodes in the tessellation grid.

The advantage is that the node matrix comprises references to the nodes in a geometric representation. The node matrix allows an easy transformation of the level of building blocks of fields, i.e. basic rectangles, to a representation of the fields by nodes.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other aspects of the invention will be apparent from and elucidated further with reference to the embodiments described by way of example in the following description and with reference to the accompanying drawings, in which FIG. 15 shows a single connected area in a matrix, FIG. 16 shows the contour of a connected area.

These figures are diagrammatic and not drawn to scale. In these figures, elements which correspond to elements already described have the same reference numerals.

DETAILED DESCRIPTION OF THE PREFERRED EMBODIMENTS

Figure 1:
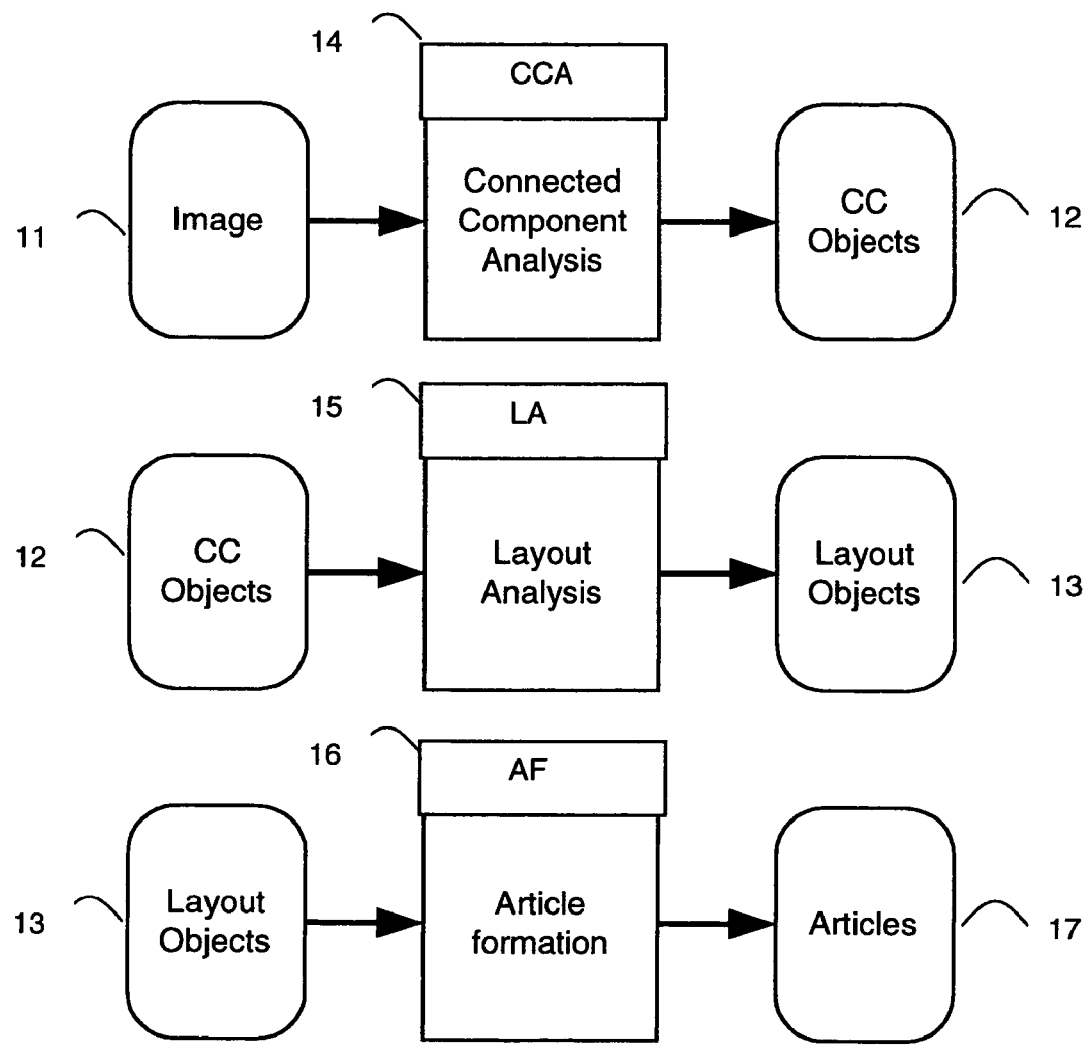
FIG. 1 shows an overview of an exemplary segmentation method.

FIG. 1 shows an overview of an exemplary segmentation method, showing three basic steps from known segmentation systems. Referring to FIG. 1, an input image 11 is processed in a CCA (Connected Component Analysis) module 14 that analyses the pixels of the image using Connected Component Analysis. First an original picture that may be a black-and-white, grayscale or colored document, e.g. a newspaper page, is scanned, preferably in gray scale. Grayscale scanned pictures are halftoned for assigning a foreground value (e.g. black) or a background value (e.g. white) to each pixel. The CCA module 14 finds foreground elements in the image by detecting connected components (CC) of adjacent pixels having similar properties. An example of these steps in the segmentation process are for instance described in U.S. Pat. No. 5,856,877.

The CCA module 14 produces as output CC Objects 12, that are connected components of connected foreground pixels. An LA (Layout Analysis) module 15 receives the CC Objects 12 as input and produces Layout Objects 13 by merging and grouping the CC Objects to form larger layout objects such as text lines and text blocks. During this phase, heuristics are used to group layout elements to form larger layout elements. This is a logical step in a regular bottom-up procedure. An AF (Article Formation) module 16 receives the Layout Objects 13 as input and produces Articles 17 as output by article formation. In this module 16, several layout objects that constitute a larger entity are grouped together. The larger entity is assembled using layout rules that apply to the original picture. For example, in a newspaper page the AF module 16 groups the text blocks and graphical elements like pictures to form the separate articles, according to the layout rules of that specific newspaper style. Knowledge of the layout type of the image, e.g. Western type magazine, Scientific text or Japanese article layouts, can be used for a rule-based approach of article formation resulting in an improved grouping of text blocks.

Figure 2:
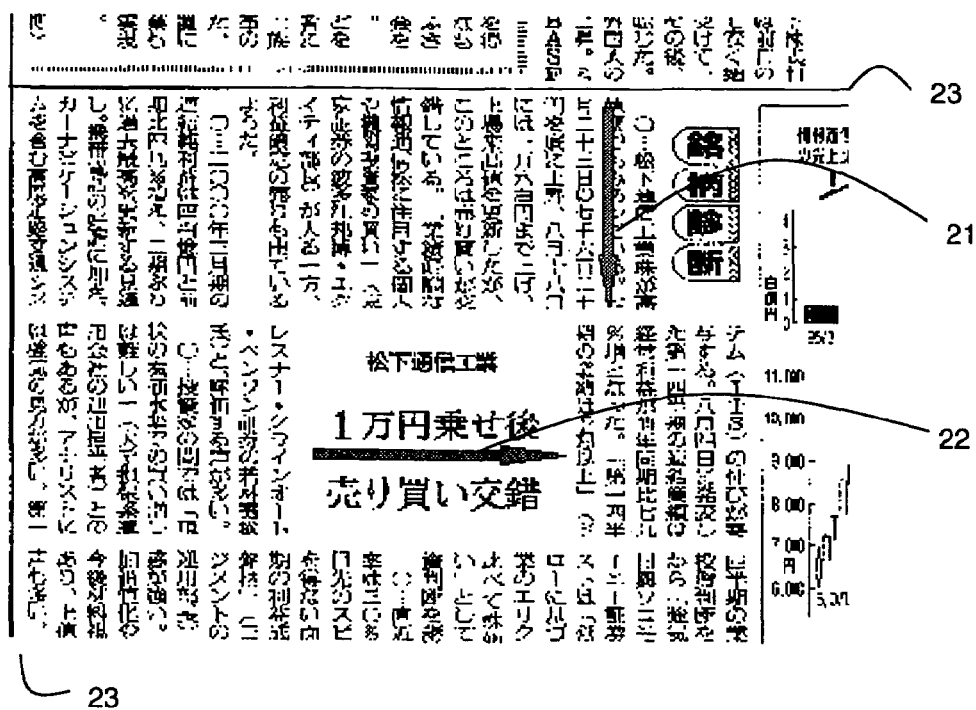
FIG. 2 shows a part of a sample Japanese newspaper.

According to the invention, additional steps are added to the segmentation as described below. The steps relate to segmentation of the image into fields before detecting elements within a field, i.e. before forming layout objects that are constituted by smaller, separated but interrelated items. FIG. 2 shows a sample Japanese newspaper. Such newspapers have a specific layout that includes text lines in both the horizontal reading direction 22 and the vertical reading direction 21. The problem for a traditional bottom-up grouping process of detected connected components is that it is not known in which direction the grouping should proceed. Hence the segmentation is augmented by an additional step of processing the background for detecting the fields in the page. Subsequently the reading direction for each field of the Japanese paper is detected before the grouping of characters is performed.

Separator elements, e.g. black lines 23 for separating columns, are detected and converted into background elements. With this option, it is possible to separate large elements of black lines 23 containing vertical and horizontal lines that are actually connected into different separator elements. In Japanese newspapers, lines are very important objects for separating fields in the layout. It is required that these objects are recognized as lines along separation directions. Without this option, these objects would be classified as graphics. Using the option, the lines can be treated as separator elements in the different orientations separately for each separation direction.

Figure 3:
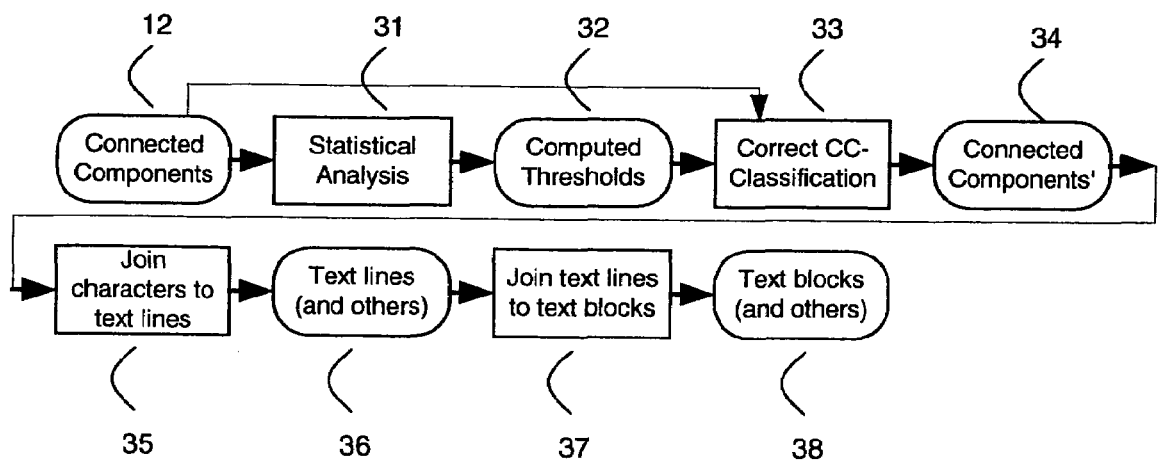
FIG. 3 shows the merging of objects along a single direction.

FIG. 3 shows a basic method of merging objects in a single direction. FIG. 3 depicts the basic function of the LA module 15 for finding the layout objects oriented in a known direction, such as text blocks for the situation that the reading order is known. Connected components 12 (CC objects) are processed in a first, analysis step 31 by statistical analysis resulting in computed thresholds 32. In a second, classification step 33, the CC-classification is corrected resulting in the corrected connected components 34, which are processed in a third, merging step 35 to join characters to text lines, resulting in text lines and other objects 36. In a fourth, text merging step 37, the text lines are joined to text blocks 38 (and possibly other graphical objects). According to the requirements for Japanese newspapers, the traditional joining of objects must be along at least two reading directions, and the basic method described above must be improved therefor.

Figure 4:
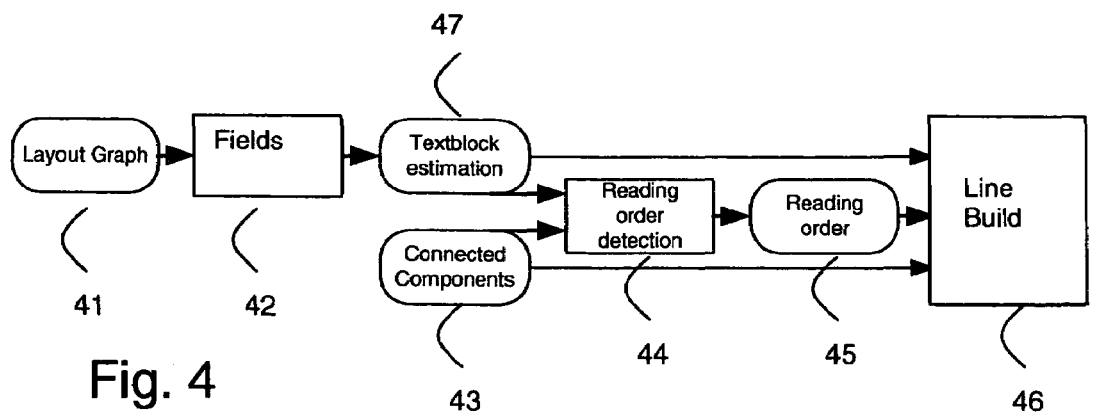
FIG. 4 shows segmentation and two directional merging of objects.

FIG. 4 shows segmentation and two directional joining of objects. Here, new additional steps have been added compared to the single directional processing in FIG. 3. Referring to FIG. 4, in a first (pre-) processing step, a graph 41 of the image is constructed. The construction of the graph 41 by finding field separators is described below. In the graph, fields are detected in a field detection step 42 by finding areas that are enclosed by edges of the graph. The relevant areas are classified as fields containing text blocks 47. In the text block 47 (using the connected components 43 or corrected connected components 34 that are in the text block area), the reading order 45 is determined in a step 44. The reading direction detection is based upon the document spectrum. Using the fields of the text blocks 47, the contained connected components 43 and the reading order 45 as input, a line build step 46 joins the characters to lines as required along the direction found.

Now the constructing of the graph 41 is described. A graph-representation of a document is created using the background of a scan. Pixels in the scan are classified as background (usually white) or foreground (usually black). Because only large areas of white provide information on fields, small noise objects are removed, e.g. by downsampling the image. The down-sampled image may further be de-speckled to remove single foreground (black) pixels.

The next task is to extract the important white areas. In this task, the first step is to detect so-called white runs, one pixel high areas of adjacent background pixels. White runs that are shorter than a predetermined minimal length are excluded from the processing.

Figure 5:
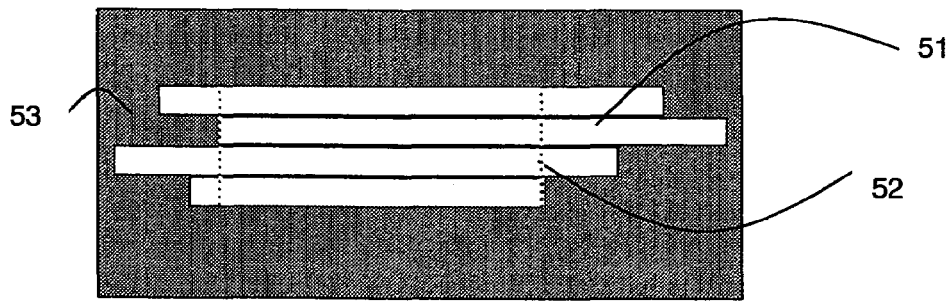
FIG. 5 shows construction of a maximal rectangle from white runs.
Figure 6:
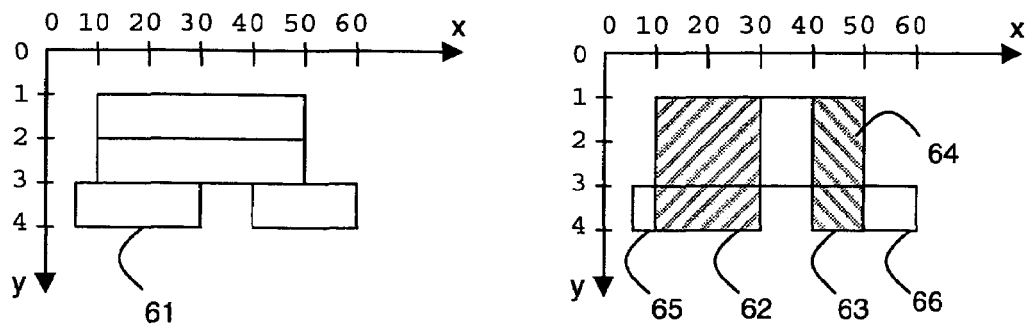
FIG. 6 shows construction of maximal white rectangles.

FIG. 5 shows, as an example, four horizontal runs 51 of white pixels, that are adjacent in the vertical direction. Foreground area 53 is assumed to have foreground pixels directly surrounding the white runs 51. A "maximal white rectangle" is defined as the largest rectangular area that can be constructed from the adjacent white runs 51, hence a rectangular white area that can not be extended without including black (foreground) pixels. A maximal white rectangle 52 is shown based on the four white runs 51 having a length as indicated by the vertical dotted lines and a width of 4 pixels. When a white rectangle can not be extended, it has a so-called maximal separating power. Such a rectangle is not a smaller part of a more significant white area. Hence the rectangle 52 is the only possible maximal rectangle of width 4. Further rectangles can be constructed of width 3 or 2. A further example is shown in FIG. 6.

The construction of white rectangles is done separately in different separation directions, e.g. horizontal and vertical white rectangles. Vertical white rectangles are detected by rotating the image, and detecting horizontal white runs for the rotated image. It is noted that depending on the type of image or application also, other separation directions may be selected such as diagonal.

An algorithm for constructing maximal white rectangles is as follows. The input of the algorithm includes all horizontal one pixel high white runs (WR) detected from a given image. Each white run is represented as a rectangle characterized by a set of coordinates $((x_1,y_1),(x_2,y_2))$, where $x_1$ and $y_1$ are coordinates of its top left corner and $x_2$ and $y_2$ are the coordinates of its bottom right corner. Each white run present in the active ordered object INPUT LIST is tested on an extension possibility. The extension possibility is formulated in the condition whether a given WR, labeled by p, can produce a maximal white rectangle (MWR) or not. If the extension possibility is FALSE, p is already a maximal one, and thus p is deleted from the active INPUT LIST and written to the active RESULT LIST. If the extension possibility is TRUE, the test for extension is repeated until all MWRs initiated by p have been constructed. Then p is deleted from the INPUT LIST and all MWRs obtained from p are written to the active RESULT LIST. When all white rectangles from the INPUT LIST have been processed, the RESULT LIST will contain all MWRs. To increase the efficiency of this algorithm, a sort on the y value is applied to the INPUT LIST. First, this algorithm is applied for horizontal WRs, i.e. for white runs with width larger than height. And after a 90° turn of the image, the algorithm can be applied to vertical WRs.

In an embodiment, the algorithm for constructing the maximal rectangles is as follows. The rectangle data are stored as a linked list, with at least the coordinates of the rectangle vertices contained in it. The INPUT LIST and RESULT LIST are stored as a linked list too, with at least three elements, such as the number of white rectangles, and pointers on the first and the last element in the linked list. The following steps are executed: Activate INPUT LIST; Initiate RESULT LIST; and Initiate BUFFER for temporary coordinates of the selected rectangle. Start from the first white rectangle labeled by $p_1$ out of the active ordered INPUT LIST. The next white rectangle on the list is labeled by $p_2$. For each white rectangle on the INPUT LIST, examine if $p_1$ has extension possibility. For the active white rectangle $p_1$, find the first one labeled by $p_{nj}$ where $j=1, \ldots, l$ with "l" representing a positive integer, on the active ordered INPUT LIST, which satisfies:

$$y_2(p_1) = y_1(p_{nj}),$$
$$x_1(p_{nj}) \leq x_2(p_1), \text{ and}$$
$$x_2(p_{nj}) \geq x_1(p_1).$$

This search results in the set $\{p_{n1}, p_{n2}, \ldots, p_{nl}\}$. Only if the set $\{p_{n1}, p_{n2}, \ldots, p_{nl}\}$ is not empty, $p_1$ is said to have extension possibility.

If $p_1$ does not have an extension possibility, then $p_1$ is a maximal white rectangle. Then write $p_1$ to the RESULT LIST, and remove p1 from the INPUT LIST, and proceed with $p_2$. If $p_1$ is extendible (i.e., it has extension possibility), then apply the extension procedure to $p_1$. Proceed with $p_2$. We note here, that $p_1$ can have an extension possibility while being maximal itself.

The extension procedure is as follows. Suppose $p_1$ has an extension possibility, then there is the set $\{p_{n1}, p_{n2}, \ldots, p_{nl}\}$. The extension procedure is applied to each element of $\{p_{n1}, p_{n2}, \ldots, p_{nl}\}$ consistently. For the white rectangle $p_1$ which is extendible with rectangle $p_{nj}$, $j=1, \ldots, l$, construct a new rectangle $p_{1,nj}$ with coordinates:

$$x_1(p_{1,nj}) = \max\{x_1(p_1), x_1(p_{nj})\},$$
$$x_2(p_{1,nj}) = \min\{x_2(p_1), x_2(p_{nj})\},$$
$$y_1(p_{1,nj}) = y_1(p_1), \text{ and}$$
$$y_2(p_{1,nj}) = y_2(p_{nj}).$$

Write the coordinates of $p_{1,nj}$, $j=1, \ldots, l$ to the "coordinates" buffer. Repeat the test on extension possibility now for $p_{1,nj}$. If the test is TRUE, $p_{1,nj}$ is maximal. Then write $p_{1,nj}$ to the RESULT LIST, otherwise extend $p_{1,nj}$.

Before applying the extension procedure to $p_{1,nj}$, we check $p_1$ and $p_{nj}$ for absorption effect. The test of $p_1$ and $p_{nj}$ for absorption effect with $p_{1,nj}$ is as follows. By absorption effect, we mean the situation in which $p_1$ ($p_{nj}$) or both is (are) completely contained in $p_{1,nj}$. In coordinates this means:

$$x_1(p_{1,nj}) \leq x_1(p_k),$$
$$x_2(p_{1,nj}) \geq x_2(p_k), \text{ where } k=1,nj \text{ and } j=1, \ldots, l.$$

If the condition is TRUE for $p_1$, then $p_1$ is absorbed by $p_{1,nj}$. Remove $p_1$ from the INPUT LIST. If the condition is TRUE for $p_{nj}$, then $p_{nj}$ is absorbed by $p_{1,nj}$. Remove $p_{nj}$ from the INPUT LIST.

The algorithm assumes that the rectangle is wider than it is high, and thus the rectangles are primarily horizontal. To construct MWRs in the vertical direction, the original binary image is rotated by 90° clockwise. The algorithm mentioned above is repeated for the rotated image. As a result, all vertical MWRs for the original image are constructed.

FIG. 6 shows construction of maximal white rectangles. The pixel coordinates are displayed along a horizontal x axis and a vertical y axis. Four white runs 61 are shown left in FIG. 6. The white runs (WR) are described as rectangles with the coordinates of their upper and bottom corners correspondingly:

WR$_1$: ((10,1),(50,2)),
WR$_2$: ((10,2),(50,3)),
WR$_3$: ((5,3),(30,4)),
WR$_4$: ((40,3),(60,4)).

All maximal white rectangles from these white runs are constructed. The resulting five maximal white rectangles (MWR) are shown on the right part of FIG. 6 as indicated by 62, 63, 64, 65 and 66. The five MWR shown are the complete set of MWR for the WR given on the left part of FIG. 6. A construction algorithm is as follows.

Let the INPUT LIST contain the four white runs 61. The first element from the INPUT LIST is WR$_1$((10,1),(50,2)). Label WR$_1$ as $p_1$. Examine $p_1$ on the extension possibility as described above. The first candidate for extension is WR$_2$ ((10,2),(50,3)). Label WR$_2$ as $p_{n1}$. Extend $p_1$ with $p_{n1}$ according to the formula for extension above, which gives a new rectangle $p_{1,n1}$ with the coordinates ((10,1),(50,3)). Test $p_1$ and $p_{n1}$ on the absorption effect with $p_{1,n1}$. As follows from the absorption test, both $p_1$ and $p_{n1}$ are absorbed by $p_{1,n1}$. Therefore, delete $p_1$ and $p_{n1}$ from the INPUT LIST.

Proceed with $p_{1,n1}$. Test $p_{1,n1}$ on the extension possibility, which gives the first candidate WR$_3$ ((5,3),(30,4)). Label WR$_3$ as $p_{t1}$. Extend $p_{1,n1}$ with $p_{t1}$ according to the extension formula. As a result, we obtain a new rectangle $p_{(1,n1),t1}$ with the coordinates ((10,1),(30,4)). Test $p_{1,n1}$ with $p_{t1}$ on the absorption effect with $p_{(1,n1),t1}$. The test fails.

Repeat the test on extension possibility for $p_{(1,n1),t1}$. The test fails, i.e. $p_{(1,n1),t1}$ has no extension possibility. It means that $p_{(1,n1),t1}$ is maximal. Write $p_{(1,n1),t1}$ with the coordinates ((10,1),(30,4)) to the RESULT LIST.

Proceed again with $p_{1,n1}$ and test it on extension possibility. The second candidate WR$_4$ ((40,3),(60,4)) is found. Label WR$_4$ as $p_{t2}$. Extend $p_{1,n1}$ with $p_{t2}$ according to the extension formula. As a result, we obtain a new rectangle $p_{(1,n1),t2}$ with the coordinates ((40,1),(50,4)).

Test $p_{1,n1}$ with $p_{t2}$ on the absorption effect with $p_{(1,n1),t2}$. The test fails, i.e. no absorption. Repeat the test on extension possibility for $p_{(1,n1),t2}$ and the test fails, i.e. $p_{(1,n1),t2}$ has no extension possibility. It means that $p_{(1,n1),t2}$ is maximal. Write $p_{(1,n1),t2}$ with the coordinates ((40,1),(50,4)) to the RESULT LIST.

Test $p_{1,n1}$ again on extension possibility. The test fails and $p_{1,n1}$ is maximal. Write $p_{1,n1}$ with the coordinates ((10,1),(50,3)) to the RESULT LIST.

Return to the INPUT LIST. The INPUT LIST on this stage contains two write runs, i.e. WR$_3$: ((5,3),(30,4)), WR$_4$: ((40,3),(60,4)). Start from WR$_3$, and label it as $p_2$. Repeat the test on extension possibility for $p_2$. The test fails, so $p_2$ is maximal. Write $p_2$ with the coordinates ((5,3),(30,4)) to the RESULT LIST. Remove $p_2$ from the INPUT LIST.

Proceed with WR$_4$ and label it as $p_3$. Test on extension possibility for $p_3$ gives us that $p_3$ is maximal. Write $p_3$ with the coordinates ((40,3),(60,4)) to the RESULT LIST. Remove $p_3$ from the INPUT LIST. Finally, the RESULT LIST contains five maximal white rectangles, i.e. MWR$_1$: ((10,1),(50,3)) indicated in FIG. 6 as 64, MWR$_2$: ((10,1),(30,4)) indicated as 62, MWR$_3$: ((40,1),(50,4)) indicated as 63, and MWR$_4$: ((5,3),(30,4)) as 65, MWR$_5$: ((40,3),(60,4)) as 66.

Figure 7:
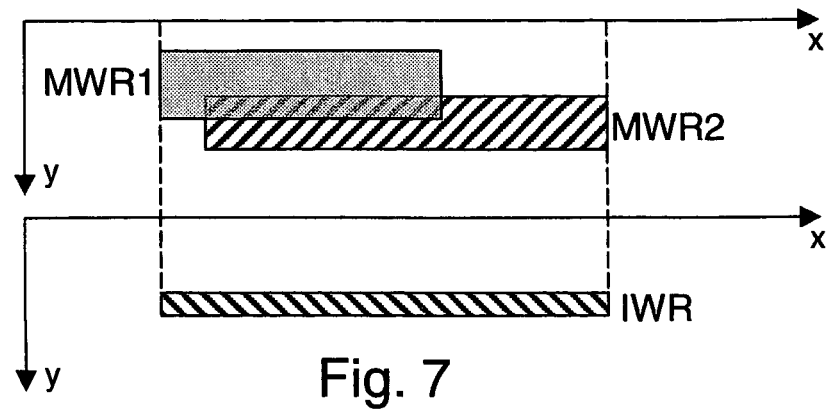
FIG. 7 shows cleaning of overlapping maximal white rectangles.

FIG. 7 shows a next step in the method according to the invention, namely a cleaning step of overlapping maximal white rectangles. In the cleaning step, plural overlapping maximal white rectangles are consolidated into a single so-called "Informative Maximal Rectangle" (IWR) that combines the most relevant properties of the original maximal white rectangles, as discussed below in detail.

The cleaning step may further include steps like checking on the size and spatial relation of the MWRs. The upper part of FIG. 7 shows, as an example, two maximal white rectangles MWR1 and MWR2. This pair is consolidated into a single Informative White Rectangle IWR in the cleaning step as shown on the lower part of FIG. 7. The process of detecting the overlap and consolidating is repeated until no relevant pairs can be formed anymore. A criterion for forming pairs may be the size of the overlap area.

Further, the cleaning step may include removing thin or short rectangles or rectangles that have an aspect ratio below a certain predefined value. The criteria for removing the rectangles are based on the type of image, e.g. a width below a predefined number of pixels indicates a separator of text lines and is not relevant for separating fields, and a length below a certain value is not relevant in view of the expected sizes of the fields.

An algorithm for the cleaning step is as follows. The start of the cleaning procedure is the whole set of MWRs constructed as described above with reference to FIGS. 5 and 6.

The cleaning procedure is applied to discard non-informative MWRs. For this reason, a measure of non-informativeness is defined. For example, a long MWR is more informative than a short one. A low aspect ratio indicates a more or less square rectangle that is less informative. Further, extremely thin rectangles, which for instance separate two text lines, must be excluded. First, all MWRs are classified as being horizontal, vertical or square by computing the ratio between their heights and widths. Square MWRs are deleted because of their non-informativeness. For the remaining horizontal and vertical MWRs the cleaning technique is applied which includes the following three steps:

Each MWR with a length or width below a given value is deleted.

Each MWR with an aspect ratio (AR) below a given value is deleted, where the AR is defined as the ratio of the longer side length divided by the shorter side length.

For each pair of overlapping horizontal (or vertical) $MWR_1$ $((x_1,y_1),(x_2,y_2))$ and horizontal (or vertical) $MWR_2$ $((a_1,b_1),(a_2,b_2))$, an informative white rectangle IWR is constructed with the following coordinates:

(a) Horizontal overlap:

$$x_1 = \min\{x_1, a_1\},$$
$$y_1 = \max\{y_1, b_1\},$$
$$x_2 = \max\{x_2, a_2\}, \text{ and}$$
$$y_2 = \min\{y_2, b_2\}.$$

(b) Vertical overlap:

$$x'_1 = \max\{x_1, a_1\},$$
$$y'_1 = \min\{y_1, b_1\},$$
$$x'_2 = \min\{x_2, a_2\}, \text{ and}$$
$$y'_2 = \max\{y_2, b_2\}.$$

This process is repeated for all pairs of overlapping MWRs. The set of MWRs now comprises Informative White Rectangles IWRs. These IWRs form the starting point for an algorithm for segmentation of the image into fields corresponding to the lay-out elements. The IWRs are potential field separators and are therefore called "separating elements". Using the IWRs, the algorithm constructs a graph for further processing into a geographical description of the image.

Figure 8:
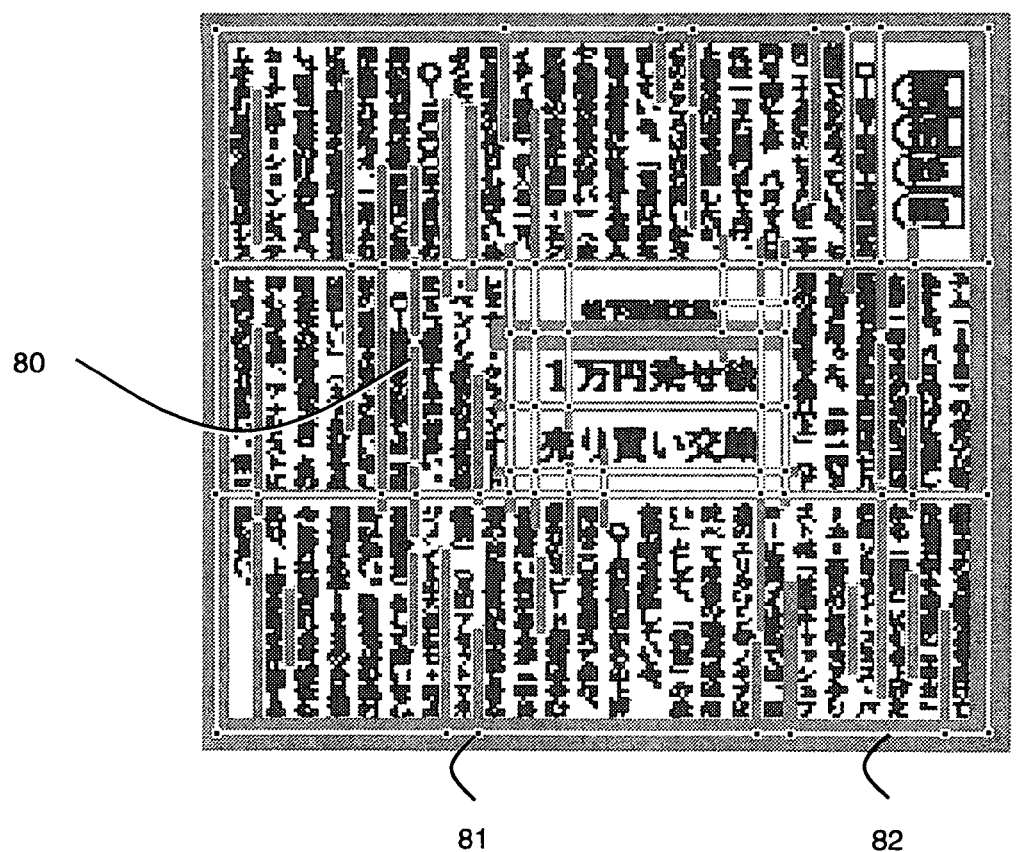
FIG. 8 shows a graph on a newspaper page.

FIG. 8 shows such a graph on a newspaper page. The picture in FIG. 8 shows a down-sampled digital image 80 of a newspaper page. The original text is visible in black in a down-sampled version corresponding to FIG. 2. The informative rectangles IWR constituting separating elements are shown in gray. For the construction of the graph, intersections of separating elements constituted by horizontal and vertical white IWRs are determined. The intersection point of two IWRs is indicated by a small black square representing a vertex or vertex 81 in the graph. Edges 82 that represent lines that separate the fields in the page are constructed by connecting pairs of vertices 81 via "field separators". The edges 82 of the graph are shown in white. The distance between the two vertices of an edge, i.e. the length, is assigned as a weight to the edge for further processing. In an alternative embodiment, a different parameter is used for assigning the weight to the edge, e.g. the colour of the pixels. An algorithm for constructing the graph is as follows.

At the beginning, the following notation and definitions for IWRs is given. Let $R=\{r_1,\ldots,r_m\}$ be the non-empty and finite set of all IWRs obtained from a given image I, where each IWR is specified by its x- and y-coordinates of top left corner and bottom right corner $((x_1^{(\tau)}, y_1^{(\tau)}), (x_2^{(\tau)}, y_2^{(\tau)}))$, $\tau=1,2,\ldots,m$ respectively. Each rectangle $r_\tau$ is classified as horizontal, vertical or square based on the ratio of its height and width. $H=\{h_1,\ldots,h_l\}$, $V=\{v_1,\ldots,v_k\}$, and $S=\{s_1,\ldots,s_d\}$ denote the subsets of horizontal, vertical and square IWRs, respectively, such that $H \cup V \cup S = R$ and $m=l+k+d$, and $H \cap V = \emptyset, V \cap S = \emptyset, H \cap S = \emptyset$ where it is assumed that $H \neq \emptyset, V \neq \emptyset$.

Further the contents of S are ignored and only the subsets H and V are used. This is based on the consideration that in most cases, white spaces that form the border of text or non-text blocks are oblong vertical or horizontal areas. Let h be part of H with coordinates $((x_1,y_1),(x_2,y_2))$ and v in V with coordinates $((a_1,b_1),(a_2,b_2))$. Then h and v have overlap if:

$$\begin{cases} x_1 \le a_2 \\ y_1 \le b_2 \\ x_2 \ge a_1 \\ y_2 \ge b_1. \end{cases}$$

By the intersection point of h and v in case of overlap, we take the unique point P defined by the coordinates:

$x_p = \frac{1}{2}(\max\{x_1, a_1\} + \min\{x_2, a_2\})$, $y_p = \frac{1}{2}(\max\{y_1, b_1\} + \min\{y_2, b_2\})$.

For IWRs, only two from all possible types of overlap occur, namely an overlap resulting in a rectangle and an overlap resulting in a point. Line overlap cannot occur, because this would be in contradiction with the concept of the MWRs.

Figure 9:
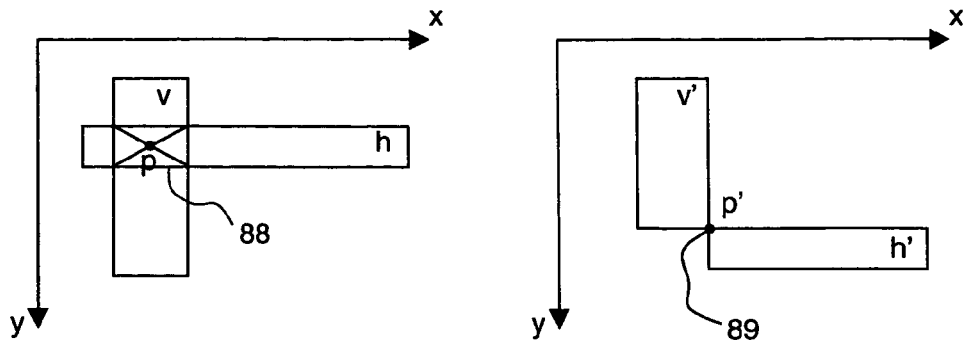
FIG. 9 shows two types of intersection of maximal rectangles.

FIG. 9 shows two types of intersection of maximal rectangles. For constructing the graph, the intersection points of vertical and horizontal informative maximal rectangles are determined to find the position of vertices of the graph, i.e. to determine the exact coordinates of the vertices. The left part of FIG. 9 shows a first type of intersection of vertical IWR v and a horizontal IWR h, which results in a rectangular area 88 with a center of intersection point P. The right part of FIG. 9 shows a second type of intersection of a vertical IWR v' and a horizontal IWR h', that results in a single intersection point 89 with a center of intersection at P'.

An algorithm for constructing the graph based on the intersection points is as follows.

$P=\{p_1,\ldots,p_N\}$ denotes the set of all intersection points of vertical IWRs and horizontal IWRs where each p in P is specified by its x- and y-coordinates $(x_p, y_p)$, where $p=1,\ldots,N$. Let the set P be found, and $G=(X,A)$ an undirected graph having correspondence to P. The graph $G=(X,A)$ includes a finite number of vertices X which are directly related to the intersection points and a finite number of edges A which describe the relation between intersection points. Mathematically this is expressed as:

$$G(P) = (X(P), A(P \times P)),$$

$$P: H \times V \rightarrow \{x_p, y_p\},$$

where $$X \equiv \{1, \cdots, N\} \text{ and}$$

$$A = (\{1, \cdots, N\} \times \{1, \cdots, N\}) \text{ with}$$

$$A(i, j) = \begin{cases} \infty, & \text{if } i \text{ and } j \text{ are not 4-chain connected,} \\ d_{ij}, & \text{if } i \text{ and } j \text{ are 4-chain connected} \end{cases}$$

where $d_{ij}$ indicates the Euclidean distance between points i and j, and where 4-chain connected means that the vertices of a rectangular block are connected in four possible directions of movement. In the above, two points i and j are 4-chain connected if they can be reached by walking around with the aid of 4-connected chain codes with min $d_{ij}$ in one direction.

The graph as constructed may now be further processed for classifying the areas within the graph as text blocks or a similar classification depending on the type of picture. In an embodiment, the graph is augmented by including foreground separators, e.g. black lines or patterned lines such as dashed/dotted lines, in the analysis. Also, edges of photos or graphic objects which are detected can be included in the analysis.

The present segmenting method may also include a step of removing foreground separators. In this step, first, foreground separators are recognized and reconstructed as single objects. The components that constitute a patterned line are connected by analyzing element heuristics, spatial relation heuristics and line heuristics, i.e. building a combined element in a direction and detecting if it classifies as a line. A further method for reconstructing a solid line from a patterned line is down-sampling and/or using the Run Length Smoothing Algorithm (RLSA) as described by K. Y. Wong, R. G. Casey, F. M. Wahl in "Document analysis system", IBM J. Res. Dev 26 (1982), pp. 647-656. After detecting the foreground separators, they are replaced by background pixels. The effect is that larger maximal white rectangles can be constructed, or supporting any other suitable method using the background pixel property for finding background separators.

Figure 11:
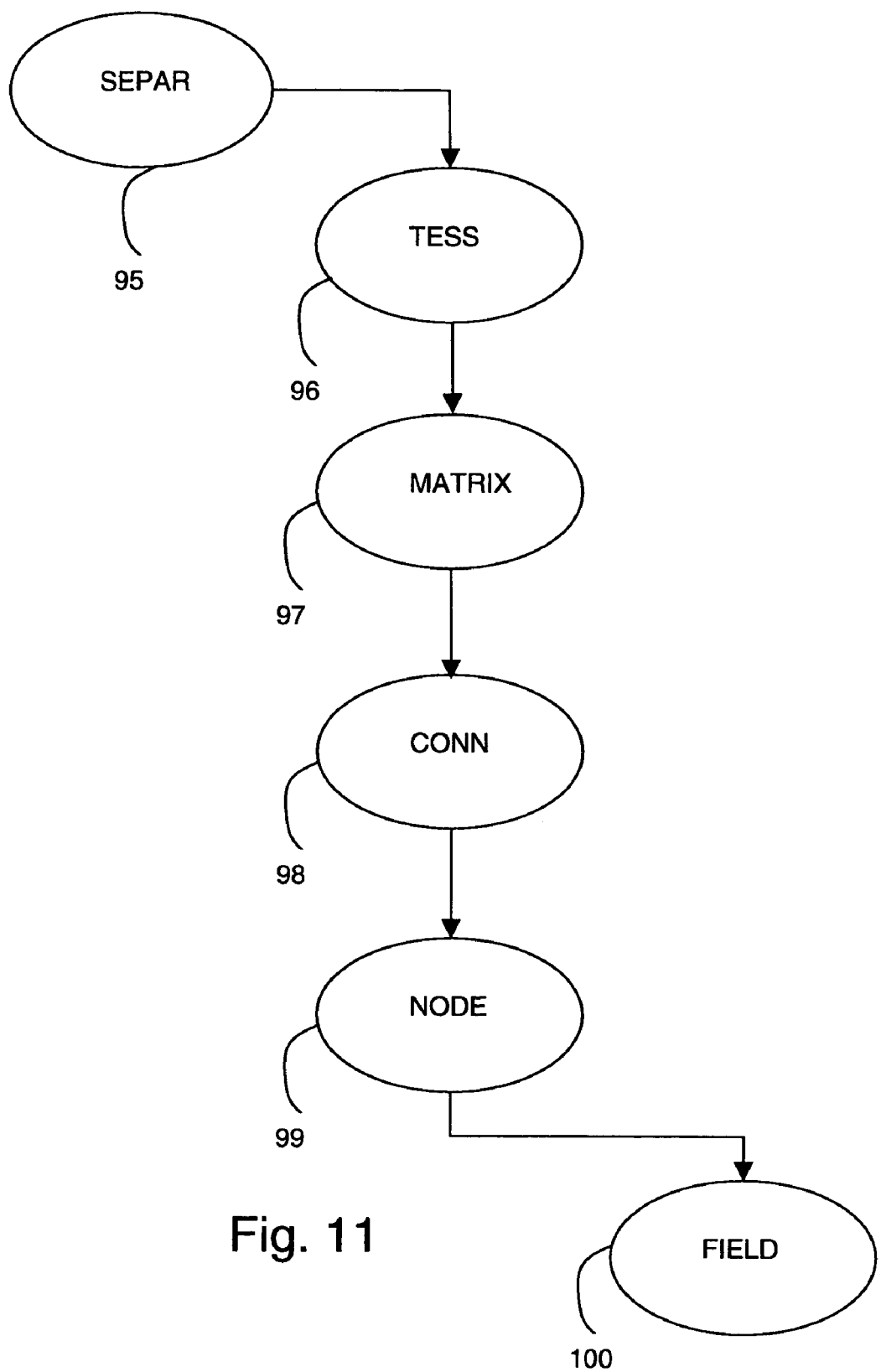
FIG. 11 shows a diagram of a method for defining fields on the basis of field separators according to an embodiment of the present invention.

FIG. 11 shows a diagram of a method of defining fields on the basis of field separators according to an embodiment of the present invention.

Basically, the task of this method is to define fields in an image, wherein fields are defined as areas containing interrelated foreground elements, e.g. text blocks in a newspaper image. The fields in an image are separated by field separators that are understood to be geometrical lines having a direction and zero thickness. Field separators correspond to areas of connected background pixels, that have an oblong shape in a separation direction, usually horizontal or vertical. The crossing points of the field separators are called nodes. According to this method, first the field separators in the image are detected, and then the fields are determined on the basis of an analysis of the field separators.

Referring to FIG. 11, in a SEPAR step 95, the image is analyzed to derive field separators. The field separators are preferably based on the analysis using maximal white rectangles as described above. The analysis using maximal white rectangles delivers a graph having edges and vertices where the edges connect. For the method of the present invention, the field separators and nodes correspond to the edges and the vertices of the graph, respectively. Also, other suitable methods may be used for determining field separators. It is noted that the process of deriving separators may already have been completed earlier, or the image is a representation of a structure on a higher level that already shows separators.

The field separators thus found may slightly deviate from the basic horizontal and vertical directions, e.g. as a consequence of scan misalignments, and such could lead to errors in the further processing steps. Therefore, a "snap to grid" step, forcing small deviations of the X- or Y-coordinate of a field separator to zero, may be added to the process at this point.

In a TESS step 96, a transformation to a building block level is performed. In this step, the image is divided into basic rectangles that form the building blocks of fields in the image, by extending the field separators until they meet the outer border of the image. In this way, a so-called tesselation grid is formed, and the areas enclosed by the (extended) field separators are defined as basic rectangles.

The generation of the tessellation grid is explained in detail below with reference to FIGS. 12 and 13.

Basically, the method now connects the basic rectangles that are not separated by a field separator into fields. A particularly efficient way to perform this process includes the following steps.

In a MATRIX step 97, a new representation of the tesselated image is made on the form of a matrix map. In the matrix map, the basic rectangles and the tesselation grid elements are represented by the matrix elements. This step is further described below with reference to FIG. 14.

In a CONN step 98, the basic rectangles are connected to form areas of connected basic rectangles. Basic rectangles are considered connected if they are separated by an extended part of a line, and are considered not connected if separated by a line part associated to a field separator. A connected component algorithm is used in this step as described below with reference to FIG. 14. The sets of connected basic rectangles as determined in this step now correspond to the fields of the original image.

In a NODE step 99, the original nodes that border the fields found in the CONN step are retrieved for defining the positions of the fields in the original image.

Finally in a FIELD step 100, the original nodes retrieved in the previous step are combined to a data structure defining a field for each area of connected basic rectangles. This amounts to a transformation from the matrix representation back to the pixel domain. This step is further described below with reference to FIGS. 15-17.

The TESS 96 step of the algorithm will now be described in greater detail by referring to FIGS. 12 and 13. FIG. 12 shows a representation of an image. The image is represented by lines associated to field separators 110 that enclose the fields 109. Field separators 110 represent background, usually white in a newspaper, and are shown as black lines. The foreground areas between the field separators, such as field 109 in this example, are to be defined as fields. The task to be performed is identifying the fields in the image.

Figure 12:
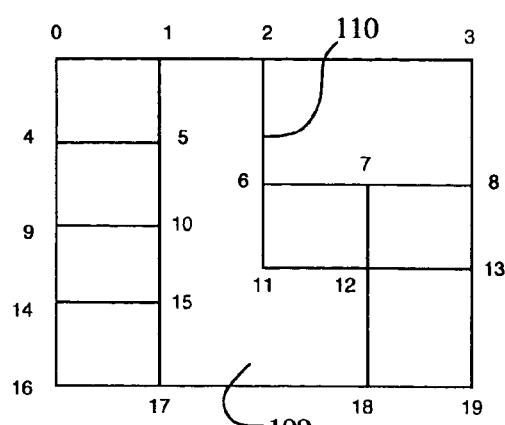
FIG. 12 shows a representation of an image.
Figure 13:
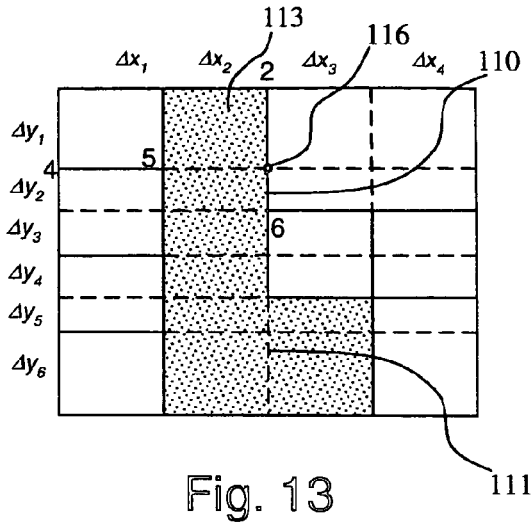
FIG. 13 shows a tessellation grid on an image.

FIG. 13 shows a tessellation grid on an image based on the input image of FIG. 12. For generating the tessellation grid, all field separators (uninterrupted lines 110 in FIG. 13) have been extended up to the borders of the image. As a result, the image is subdivided by vertical lines in 4 X-segments ($\Delta X_1$ to $\Delta X_4$) and by horizontal lines in 6 Y-segments ($\Delta Y_1$ to $\Delta Y_6$). Extensions of field separators 110 are indicated by dashed lines 111. For example, nodes 2 and 6 are actual nodes of a field separator and the extension causes a virtual node 116 to be present in between nodes 2 and 6. Two basic rectangles are formed in the area directly to the right of the line between nodes 2 and 6. Every rectangle in the tessellation grid formed by the lines based on extending the field separators is a so-called basic rectangle. For example, the basic rectangle 113 is part of a connected area as indicated by the shaded area, which is constituted by every basic rectangle not separated from the basic rectangle 113 by a field separator. The area of connected basic rectangles can be constructed easily as is described below with reference to FIG. 14.

It is noted that this approach may be extended to areas which are not substantially rectangular structures. Piecewise linearization and/or elastically deformation of the planar graph can be applied for processing images containing "curved bordered" areas.

In the MATRIX step 97 of the basic algorithm, the tesselated image as shown in FIG. 13 is converted into a matrix representation, in which every basic rectangle and every line segment is associated with a matrix element. The tesselated image spans 4 basic rectangles and 5 vertical lines associated with field separators when traversed in the horizontal direction and accordingly, the matrix representation has 9 columns. The tesselated image spans 6 basic rectangles and 7 horizontal lines when traversed in the vertical direction and accordingly, the matrix representation has 13 rows.

Initially, every matrix element is given the value 1. Then, all matrix elements are systematically checked for being associated to a field separator of the original image and, if so, are changed in value to 0. Thus, a foreground element is represented by 1 and the background element by 0.

Alternatively, matrix elements may be changed to 0 by checking the list of field separators, which would normally result in less operations.

Figure 14:
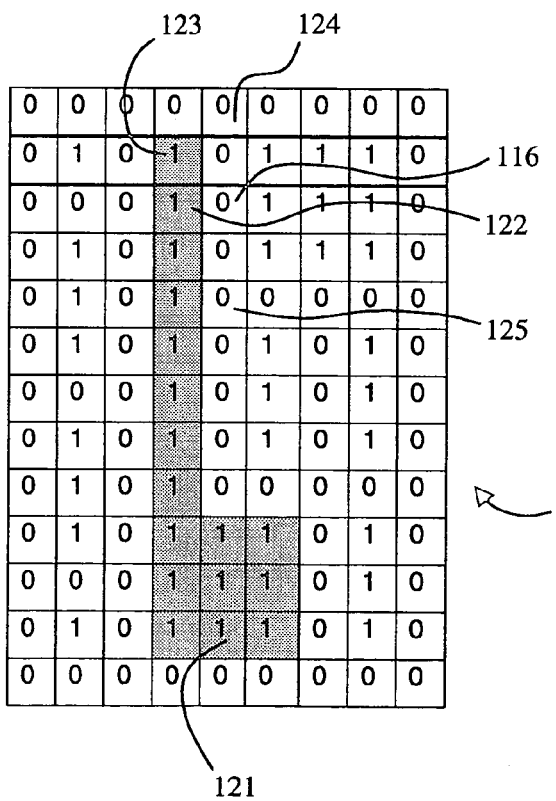
FIG. 14 shows a matrix map of the tessellation grid.

FIG. 14 shows the resulting matrix map 120 of the image in FIG. 13. For example, the basic rectangle 113 is now reduced to a single element 123 of the matrix and an extended line segment 111 is now an element 121 of the matrix. Nodes 2 and 6 are represented by elements 124 and 125. Also shown is the matrix element corresponding to virtual nod 116. This element has the value 1, because it is part of a field separator. It is to be noted that the geographical shape is not preserved, because the length of the lines between nodes are not taken into account. The relation between the original nodes in the representation of the image and the tessellation grid is stored separately as described below with reference to FIG. 17.

The area 109 (FIG. 12) is shown in FIG. 14 as a shaded area 122 of elements all being 1.

In the CONN step 98 of the algorithm, the matrix map as generated is subsequently subjected to a connected component process for finding sets of connected elements having a value of 1 in the matrix. Connected component algorithms are widely known in the literature and will therefore not be described here further.

Figures 15, 16:
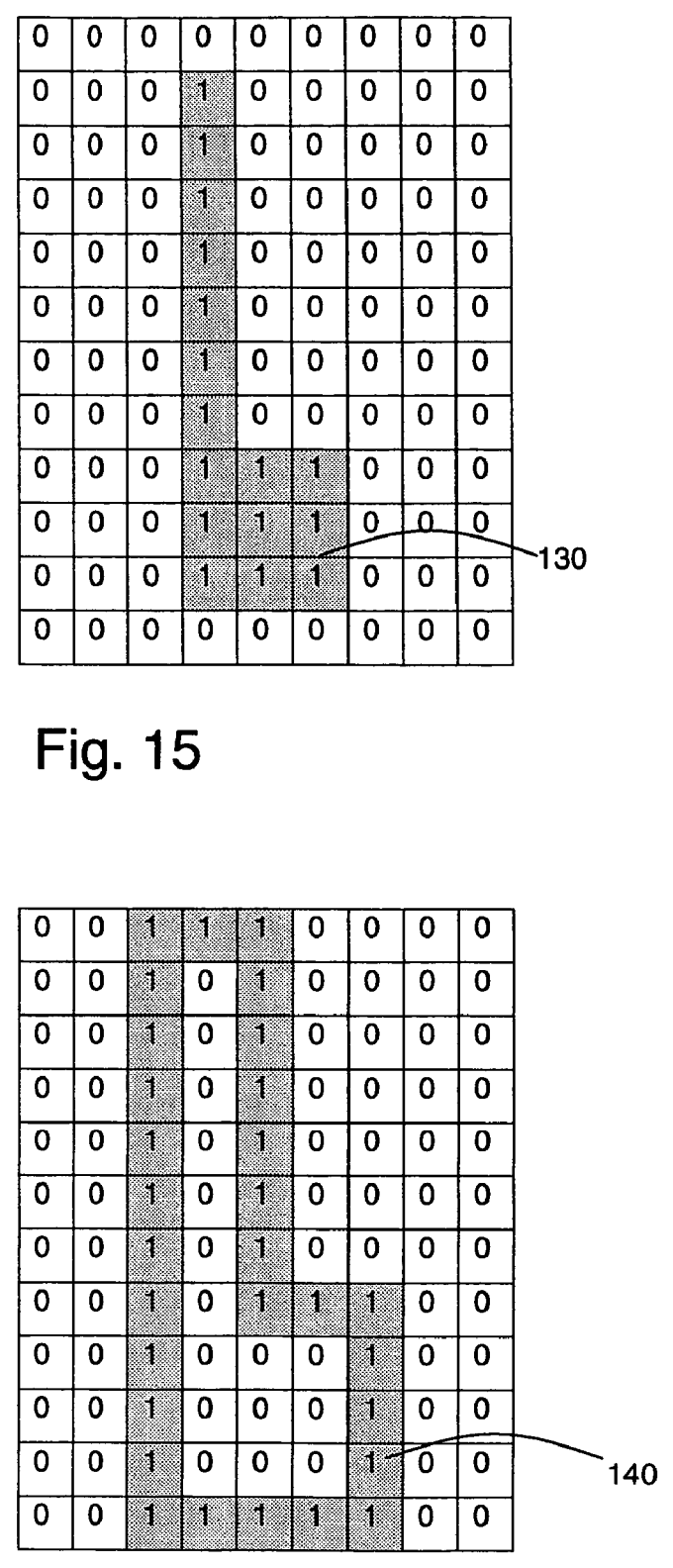

The NODE step 99 of the algorithm is now described in more detail. As an example, FIG. 15 shows a single connected area 130 in the matrix of FIG. 14. The matrix shown is based on the tessellation grid as described above, but only connected area 130 as detected by the connected components process is indicated by a shaded area. The constituting elements of the connected area have a value of 1 and are surrounded by elements of a value of zero. In the following steps, a field is defined based on a contour around the connected area.

FIG. 16 shows the contour 140 of the connected area 130. The contour 140 is indicated by a shaded area of values 1 around an area having values 0 corresponding to the connected area 130. For finding the contour, first the area 130 is dilated by one pixel, and then the original area is subtracted.

Figure 17:
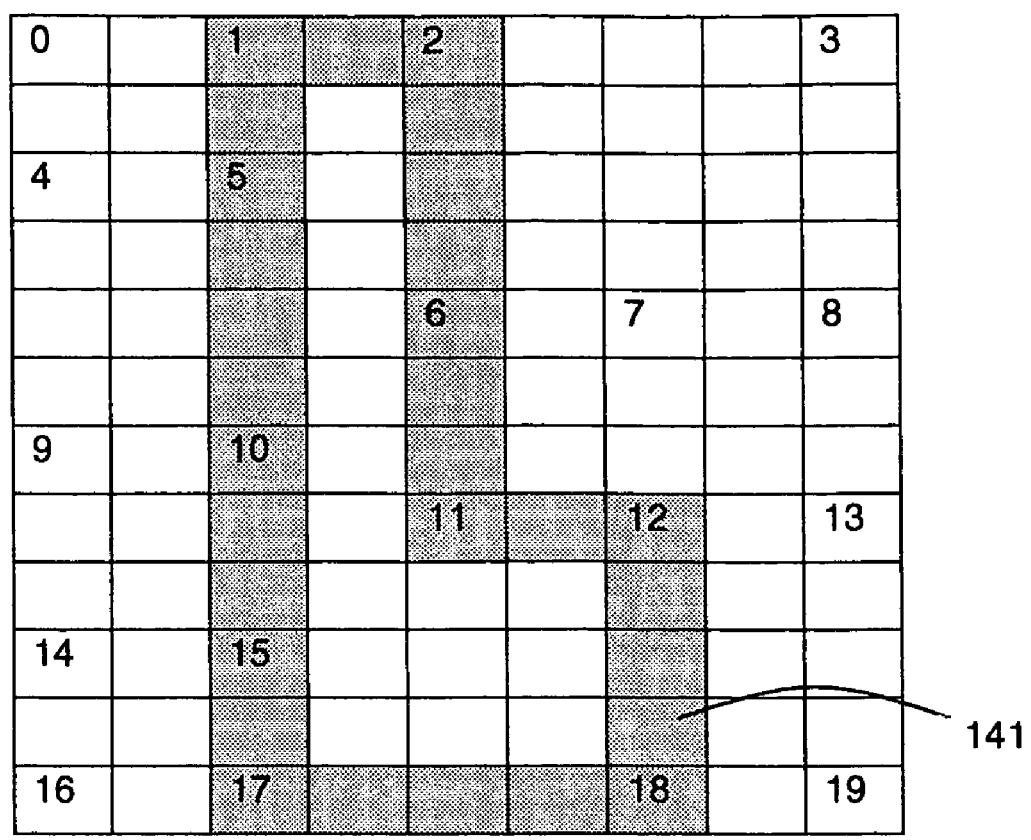
FIG. 17 shows a node matrix.

FIG. 17 shows a node matrix. Referring to FIG. 17, the matrix has the same dimension as the matrix map. The value of the elements is either a node number (between 0 and 19) or empty. The node numbers refer to the nodes in the original image as shown in FIG. 12. The contour 140 of the connected area 130 derived above is projected on the node matrix and shown by a shaded area 141.

The node matrix is constructed as follows. Initially, the value of the elements is set to 'empty'. Then actual nodes of field separators are entered into the matrix, e.g. on the basis of the vertex list of the graph.

The task is to extract all nodes belonging to the contour 140 of the area 130. The nodes present in the contour are retrieved by tracing the contour and denoting the nodes therein.

After tracing the contour, the nodes are coupled to the original image representation in the FIELD step 100 of the algorithm. If necessary, an inverse of the "snap-to-grid" process is applied, and the node numbers are coupled again with the original set of nodes. Finally, if required, the nodes and/or edges of a field are ordered, e.g. in the clockwise direction. The ordering may be required for an area computation or displaying.

The node extraction and field determination must of course be performed for all fields in the image.

It is noted that areas may enclose each other, which results in disjunct polygons, e.g. a text encirclement. In order to be able to operate on areas bounded by multiple disjunct polygons, a known technique connecting those polygons is used. The two contours of the polygons are connected by a so-called "zero area bridge", actually 2 line segments, one entering and one leaving the inner contour.

Figure 10:
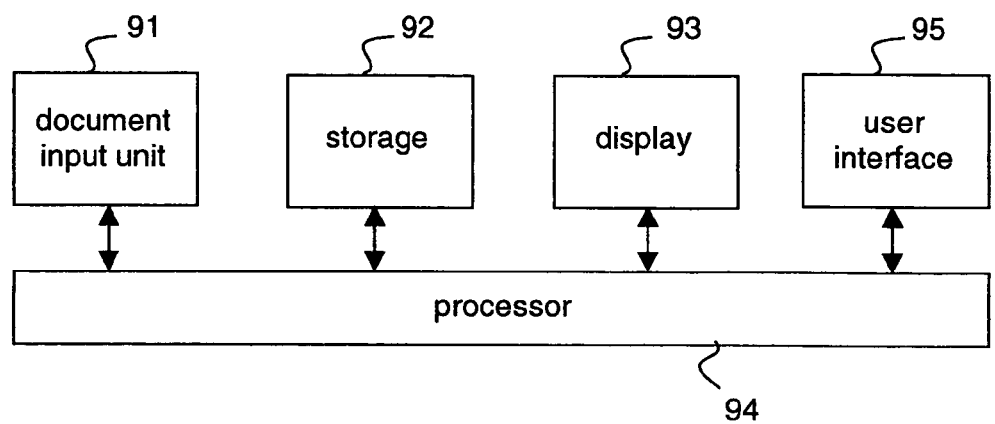
FIG. 10 shows a device for segmenting a picture according to an embodiment of the present invention.

FIG. 10 shows a device wherein the method for segmenting a picture in accordance with the present invention is implemented. Referring to FIG. 10, the device has an input unit 91 for entering a digital image. The input unit 91 may comprise a scanning unit for scanning an image from paper such as an electro-optical scanner, or a digital communication unit for receiving the image from a network such as internet, or a playback unit for retrieving digital information from a record carrier such as an optical disc drive. The input unit 91 is coupled to a processing unit 94, which cooperates with a memory unit 92. The processing unit 94 may comprise a general purpose computer central processing unit (CPU) and supporting circuits and operates using software for performing the segmentation as described above. In particular, the software includes modules (not separately shown in FIG. 10) for constructing the tesselation grid by extending the field separators to the outer borders of the image, constructing the basic rectangles and constructing the fields by connecting adjacent basic rectangles that are not separated by a field separator. In addition, the software includes modules for constructing a matrix map representing the tessellation grid and constructing a node matrix related to the nodes in the tessellation grid.

The processing unit 94 may further include a user interface 95 provided with a controller such as a keyboard, a mouse device or operator buttons. The output of the processing unit 94 is coupled to a display unit 93. In an embodiment, the display unit 93 is a printing unit for outputting a processed image on paper, or a recording unit for storing the segmented image on a record carrier such as a magnetic tape or optical disk.

The steps of the present methods are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. The computer programs are readable using a known computer or computer-based device.

Although the invention has been mainly explained by embodiments where a newspaper page as the digital image is segmented, the invention is also suitable for any digital representation comprising fields on a background, such as electrical circuits in layout images for IC design or streets and buildings on city maps. Further it is noted that the graph as starting point for executing the segmenting by shortest cycles may be constructed differently than the graph described above based on the MWR system. For example, a graph may be constructed using tiles as described in the article by Antonacopoulos and Ritchings mentioned above. Further the weight assigned to an edge in the graph is not necessarily the distance. It must be selected to correspond to a contribution to the shortest cycle, for example, the weight may be the surface of the tile.

It is noted, that in the present application, the use of the verb 'comprise' and its conjugations does not exclude the presence of other elements or steps than those listed and the word 'a' or 'an' preceding an element does not exclude the presence of a plurality of such elements, that any reference signs do not limit the scope of the claims, that the invention and every unit or means mentioned may be implemented by suitable hardware and/or software and that several 'means' or 'units' may be represented by the same item. Further, the scope of the invention is not limited to the embodiments, and the invention lies in each and every novel feature or combination of features described above.

The invention claimed is:

1. A method of segmenting a composite image of pixels into a number of fields corresponding to layout elements of the image, the pixels having a value representing an intensity and/or color of a picture element, the method comprising:
    finding field separators corresponding to areas of adjacent pixels of the image, having a predefined property indicative of a background of the image;
    extending the field separators along at least one separation direction to an outer border of the image;
    constructing a tesselation grid of lines corresponding to the extended field separators;
    constructing a set of basic rectangles, a basic rectangle being an area enclosed by lines of the tesselation grid; and
    constructing the fields by connecting basic rectangles that are adjacent and not separated by a field separator.

2. The method as claimed in claim 1, wherein the step of constructing the set of basic rectangles comprises:
    constructing a matrix map representing the tessellation grid by a two-dimensional array of elements that each represent either a basic rectangle or a line segment of the tessellation grid, an element having a first predefined value for representing a line corresponding to a field separator or a different value for representing a basic rectangle or a line corresponding to an extended field separator.

3. The method as claimed in claim 2, wherein the step of constructing the fields comprises:
    connecting elements in the matrix map that have said different value.

4. The method as claimed in claim 1, wherein nodes are defined at points where the field separators connect, and wherein the step of constructing the fields comprises:
    constructing a node matrix corresponding to the tessellation grid and including elements referring to nodes in the tessellation grid.

5. The method as claimed in claim 4, wherein the step of constructing the fields comprises:
    constructing a contour for each area of connected elements in the matrix map and finding the nodes defining the field by projecting the contour on the node matrix.

6. The method as claimed in claim 5, wherein said contour is constructed by dilating the area and subtracting the area of the dilated area.

7. The method as claimed in claim 1, wherein the segmenting comprises:
    constructing a graph, the graph having edges corresponding to areas of adjacent pixels having a predefined property indicative of a background of the image and vertices where the edges connect, and associating field separators to the edges of the graph, and
    forming said tessellation grid by extending the field separators to an outer border of the image.

8. The method as claimed in claim 7, wherein the constructing of the graph comprises:
    cleaning the graph by removing vertices that are connected to less then two edges and/or removing any edges that connect to such vertices.

9. The method as claimed in claim 1, further comprising:
    snapping the lines in the tessellation grid to two orthogonal separation directions.

10. A computer program product embodied on at least one computer-readable medium, for segmenting a composite image of pixels into a number of fields corresponding to layout elements of the image, the pixels having a value representing an intensity and/or color of a picture element, the computer program product comprising computer-executable instructions for:
    finding field separators corresponding to areas of adjacent pixels of the image, having a predefined property indicative of a background of the image;
    extending the field separators along at least one separation direction to an outer border of the image;
    constructing a tesselation grid of lines corresponding to the extended field separators;
    constructing a set of basic rectangles, a basic rectangle being an area enclosed by lines of the tesselation grid; and
    constructing the fields by connecting basic rectangles that are adjacent and not separated by a field separator.

11. The computer program product as claimed in claim 10, wherein the computer-executable instructions for constructing the set of basic rectangles comprise computer-executable instructions for:
    constructing a matrix map representing the tessellation grid by a two-dimensional array of elements that each represent either a basic rectangle or a line segment of the tessellation grid, an element having a first predefined value for representing a line corresponding to a field separator or a different value for representing a basic rectangle or a line corresponding to an extended field separator.

12. The computer program product as claimed in claim 10, wherein nodes are defined at points where the field separators connect, and wherein the computer-executable instructions for constructing the fields comprises computer-executable instructions for:
  constructing a node matrix corresponding to the tessellation grid and including elements referring to nodes in the tessellation grid.

13. The computer program product as claimed in claim 12, wherein the computer-executable instructions for constructing the fields comprise computer-executable instructions for:
  constructing a contour for each area of connected elements in the matrix map and finding the nodes defining the field by projecting the contour on the node matrix.

14. The computer program product as claimed in claim 10, further comprising computer-executable instructions for:
  snapping the lines in the tessellation grid to two orthogonal separation directions.

15. A device for segmenting a composite image of pixels into a number of fields corresponding to layout elements of the image, the pixels having a value representing the intensity and/or color of a picture element, the device comprising:
  an input unit for inputting an image; and
  a processing unit for finding field separators corresponding to areas of adjacent pixels having a predefined property indicative of a background of the image,
  wherein the processing unit extends the field separators along at least one separation direction to an outer border of the image,
  constructs a tesselation grid of lines corresponding to the extended field separators,
  constructs a set of basic rectangles, a basic rectangle being an area enclosed by lines of the tesselation grid, and
  constructs the fields by connecting basic rectangles that are adjacent and not separated by a field separator.

16. The device as claimed in claim 15, wherein the processing unit constructs a matrix map representing the tessellation grid by a two-dimensional array of elements that each represent either a basic rectangle or a line segment of the tessellation grid, an element having a first predefined value for representing a line corresponding to a field separator or a different value for representing a basic rectangle or a line corresponding to an extended field separator.

17. The device as claimed in claim 15, wherein the processing unit constructs a node matrix corresponding to the tessellation grid and including elements referring to nodes in the tessellation grid.

18. The device as claimed in claim 15, further comprising:
  a display unit for displaying fields of the image after segmenting.

19. The device as claimed in claim 15, wherein the processing unit snaps the lines in the tessellation grid to two orthogonal separation directions.

* * * * *